(12) United States Patent
Takahashi et al.

(10) Patent No.: US 10,785,525 B2
(45) Date of Patent: Sep. 22, 2020

(54) RECEPTION APPARATUS AND DATA PROCESSING METHOD

(71) Applicant: Saturn Licensing LLC, New York, NY (US)

(72) Inventors: Kazuyuki Takahashi, Chiba (JP); Lachlan Bruce Michael, Saitama (JP); Yuichi Hirayama, Chiba (JP); Satoshi Okada, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/572,921

(22) PCT Filed: Jul. 22, 2016

(86) PCT No.: PCT/JP2016/071566
§ 371 (c)(1),
(2) Date: Nov. 9, 2017

(87) PCT Pub. No.: WO2017/026248
PCT Pub. Date: Feb. 16, 2017

(65) Prior Publication Data
US 2018/0124451 A1  May 3, 2018

(30) Foreign Application Priority Data

Aug. 7, 2015 (JP) .................. 2015-157707

(51) Int. Cl.
*H04N 21/8547* (2011.01)
*H04N 21/43* (2011.01)
(Continued)

(52) U.S. Cl.
CPC .......... *H04N 21/4305* (2013.01); *G06F 1/12* (2013.01); *H04H 20/95* (2013.01); *H04H 60/40* (2013.01);
(Continued)

(58) Field of Classification Search
None
See application file for complete search history.

(56) References Cited

U.S. PATENT DOCUMENTS

| 4,458,308 A | 7/1984 | Holtey et al. |
| 2010/0110916 A1* | 5/2010 | Pratt, Jr. ................ H04L 43/50 370/252 |

(Continued)

FOREIGN PATENT DOCUMENTS

| CN | 101355531 A | 1/2009 |
| CN | 101599894 A | 12/2009 |

(Continued)

OTHER PUBLICATIONS

International Search Report dated Oct. 18, 2016 in PCT/JP2016/071566, 2 pages.

(Continued)

*Primary Examiner* — Christopher Braniff
(74) *Attorney, Agent, or Firm* — Oblon, McClelland, Maier & Neustadt, L.L.P.

(57) ABSTRACT

The present technology relates to a reception apparatus and a data processing method that enable clock synchronization in a more suitable manner. The reception apparatus receives a digital broadcast signal of an IP transmission method that includes time information and a stream of content. The time information includes a seconds field and a nanoseconds field. The reception apparatus then generates a processing clock synchronized with the time information on the basis of the time information included in the digital broadcast signal, and processes the stream included in the digital broadcast signal on the basis of the processing clock. The present technology can be applied to, for example, television receivers conforming to the IP transmission method.

19 Claims, 10 Drawing Sheets

(51) Int. Cl.
  *H04H 60/40*  (2008.01)
  *H04H 20/95*  (2008.01)
  *H04J 3/06*   (2006.01)
  *H04N 21/434* (2011.01)
  *G06F 1/12*   (2006.01)
  *H04L 7/00*   (2006.01)

(52) U.S. Cl.
  CPC .......... *H04J 3/0664* (2013.01); *H04L 7/0004* (2013.01); *H04L 7/0012* (2013.01); *H04N 21/434* (2013.01); *H04N 21/8547* (2013.01); *H04J 3/0667* (2013.01)

(56) References Cited

U.S. PATENT DOCUMENTS

| | | | |
|---|---|---|---|
| 2016/0112974 A1* | 4/2016 | Shenoi | H04J 3/065 370/350 |
| 2016/0205441 A1 | 7/2016 | Iguchi et al. | |
| 2018/0242049 A1 | 8/2018 | Iguchi et al. | |

FOREIGN PATENT DOCUMENTS

| | | |
|---|---|---|
| CN | 102340481 A | 2/2012 |
| CN | 102420687 | 4/2012 |
| EP | 3 054 608 A1 | 8/2016 |
| JP | 2011-518509 A | 6/2011 |
| JP | 2014-230154 A | 12/2014 |
| WO | WO 2014/188960 A1 | 11/2014 |
| WO | WO2015/045362 | 4/2015 |
| WO | WO 2015/068352 A1 | 5/2015 |
| WO | WO2015068352 * | 5/2015 |
| WO | WO 2015/089848 A1 | 6/2015 |

OTHER PUBLICATIONS

Extended European Search Report dated Nov. 26, 2018 in corresponding European Patent Application No. 16834945.4, 10 pages.
Reinhard Exel, "Mitigation of Asymmetric Link Delays in IEEE 1588 Clock Synchronization Systems", IEEE Communications Letters, vol. 18, No. 3, XP011544857, Mar. 2017, pp. 507-510.

* cited by examiner

F I G . 1
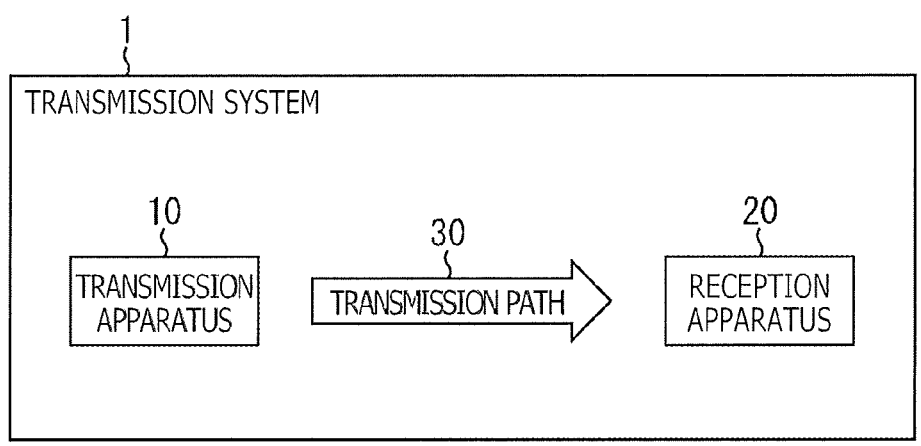

F I G. 5

PTP

```
struct Timestamp
{
    UInteger48 secondsField;
    UInteger32 nanosecondsField;
};
```

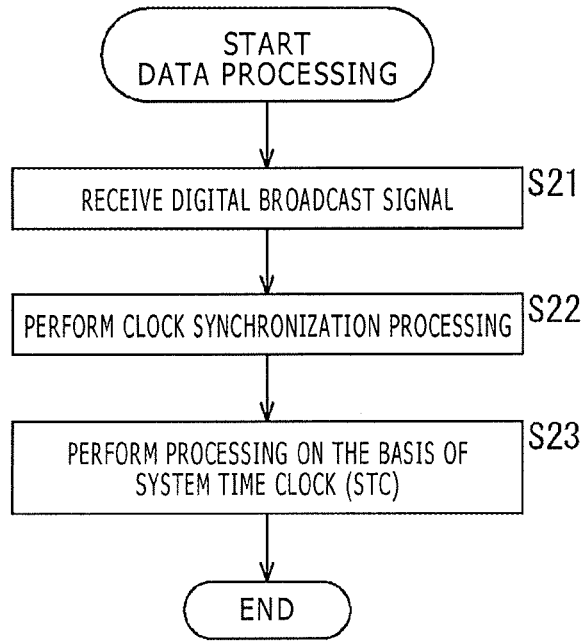
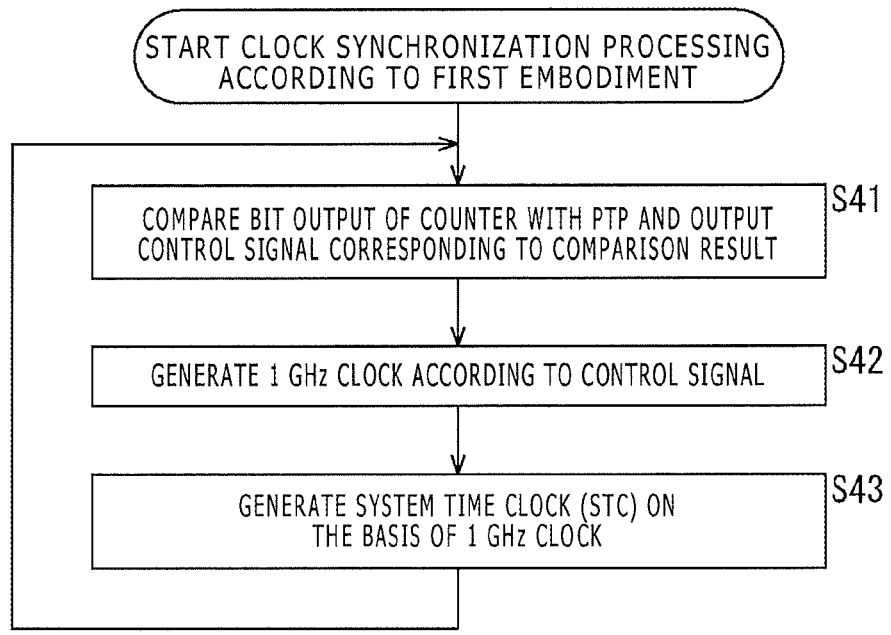

RECEPTION APPARATUS AND DATA PROCESSING METHOD

TECHNICAL FIELD

The present technology relates to a reception apparatus and a data processing method, and particularly relates to a reception apparatus and a data processing method that enable clock synchronization in a more suitable manner.

BACKGROUND ART

For example, it has been determined that the ATSC (Advanced Television Systems Committee) 3.0, which is one of the next-generation terrestrial broadcasting standards, will mainly employ UDP/IP, i.e., the method of using IP (Internet Protocol) packets including UDP (User Datagram Protocol) packets (hereinafter referred to as "IP transmission method") for data transmission, instead of TS (Transport Stream) packets. Moreover, broadcasting methods other than ATSC 3.0 are also expected to employ the IP transmission method in the future.

Further, there is a disclosed technology that uses the NTP (Network Time Protocol) as time information when the IP transmission method is employed (for example, refer to PTL 1). The time information is used for synchronizing the transmission side and the reception side.

CITATION LIST

Patent Literature

[PTL 1]
JP 2014-230154A

SUMMARY

Technical Problems

However, since there is no established technical method for performing clock synchronization in the IP transmission method, there have been demands for a proposal for performing the clock synchronization in a more suitable manner.

The present technology has been made in view of the foregoing circumstances and enables the clock synchronization in a more suitable manner.

Solution to Problems

A reception apparatus according to a first aspect of the present technology includes a reception unit, a clock generation unit, and a processing unit. The reception unit receives a digital broadcast signal of an IP transmission method including time information and a stream of content. The time information includes a seconds field and a nanoseconds field. The clock generation unit generates a processing clock synchronized with the time information on the basis of the time information included in the digital broadcast signal. The processing unit processes the stream included in the digital broadcast signal on the basis of the processing clock.

The reception apparatus according to the first aspect of the present technology may be an independent apparatus or may be an internal block constituting one apparatus. Further, a data processing method according to the first aspect of the present technology is a data processing method corresponding to the above-described reception apparatus according to the first aspect of the present technology.

In the reception apparatus and the data processing method according to the first aspect of the present technology, a digital broadcast signal of an IP transmission method including time information and a stream of content is received. The time information includes a seconds field and a nanoseconds field. A processing clock synchronized with the time information is generated on the basis of the time information included in the digital broadcast signal. The stream included in the digital broadcast signal is processed on the basis of the processing clock.

A reception apparatus according to a second aspect of the present technology includes a reception unit, a demodulation unit, a clock generation unit, and a processing unit. The reception unit receives a digital broadcast signal of an IP transmission method including time information and a stream of content. The demodulation unit demodulates a frame of a physical layer in a protocol stack of the IP transmission method. The clock generation unit generates a processing clock on the basis of a system clock generated from a physical-layer clock corresponding to a frame period of the frame. The processing clock is based on the time information obtained from the frame. The processing unit processes the stream included in the digital broadcast signal on the basis of the processing clock. The physical-layer clock and the system clock are synchronized in a transmission apparatus that transmits the digital broadcast signal.

The reception apparatus according to the second aspect of the present technology may be an independent apparatus or may be an internal block constituting one apparatus. Further, a data processing method according to the second aspect of the present technology is a data processing method corresponding to the above-described reception apparatus according to the second aspect of the present technology.

In the reception apparatus and the data processing method according to the second aspect of the present technology, a digital broadcast signal of an IP transmission method including time information and a stream of content is received. A frame of a physical layer in a protocol stack of the IP transmission method is demodulated. A processing clock based on the time information obtained from the frame is generated on the basis of a system clock generated from a physical-layer clock corresponding to a frame period of the frame. The stream included in the digital broadcast signal is processed on the basis of the processing clock. Further, the physical-layer clock and the system clock are synchronized in a transmission apparatus that transmits the digital broadcast signal.

Advantageous Effects of Invention

According to the first aspect and the second aspect of the present technology, clock synchronization can be performed in a more suitable manner.

Note that the effects described herein are not necessarily limitative, and any of the effects described in the present disclosure may be exhibited.

BRIEF DESCRIPTION OF DRAWINGS

FIG. 1 is a diagram illustrating a configuration of one embodiment of a transmission system to which the present technology is applied.

FIG. 5 is a diagram illustrating an exemplary configuration of the PTP.

FIG. 6 is a flowchart for describing a flow of data processing.

FIG. 7 is a flowchart for describing a flow of clock synchronization processing according to a first embodiment.

DESCRIPTION OF EMBODIMENT

The following describes embodiments of the present technology with reference to the drawings. Note that the description will be made in the following order.

1. System Configuration
2. Clock Synchronization Method to which Present Technology is Applied
 (1) First Embodiment: Clock Synchronization Method using PTP as Time Information
 (2) Second Embodiment: Clock Synchronization Method when Physical-Layer Clock and System Clock are Synchronized
3. Modification
4. Computer Configuration <1. System Configuration>

(Exemplary Configuration of Transmission System)

FIG. 1 is a diagram illustrating a configuration of one embodiment of a transmission system to which the present technology is applied. Note that the "system" means a group of a plurality of apparatuses logically gathered.

In FIG. 1, a transmission system 1 includes a transmission apparatus 10 and a reception apparatus 20. This transmission system 1 performs data transmission conforming to the standard of the digital broadcasting employing an IP transmission method such as ATSC 3.0.

The transmission apparatus 10 transmits content via a transmission path 30. For example, the transmission apparatus 10 transmits a broadcast stream as a digital broadcast signal via the transmission path 30. The broadcast stream includes (components) such as video and audio constituting the content for a television program or the like as well as signaling.

The reception apparatus 20 receives and outputs the content transmitted from the transmission apparatus 10 via the transmission path 30. For example, the reception apparatus 20 receives the digital broadcast signal from the transmission apparatus 10. The reception apparatus 20 then obtains the (components) such as video and audio constituting the content as well as the signaling from the broadcast stream, and then reproduces images and sound of the content such as the television program.

Note that the transmission path 30 in the transmission system 1 may be terrestrial broadcasting or may be, for example, satellite broadcasting using broadcasting satellites or communication satellites, cable broadcasting using cables (CATV), or the like.

(Exemplary Configuration of Reception Apparatus)

Figure 2:
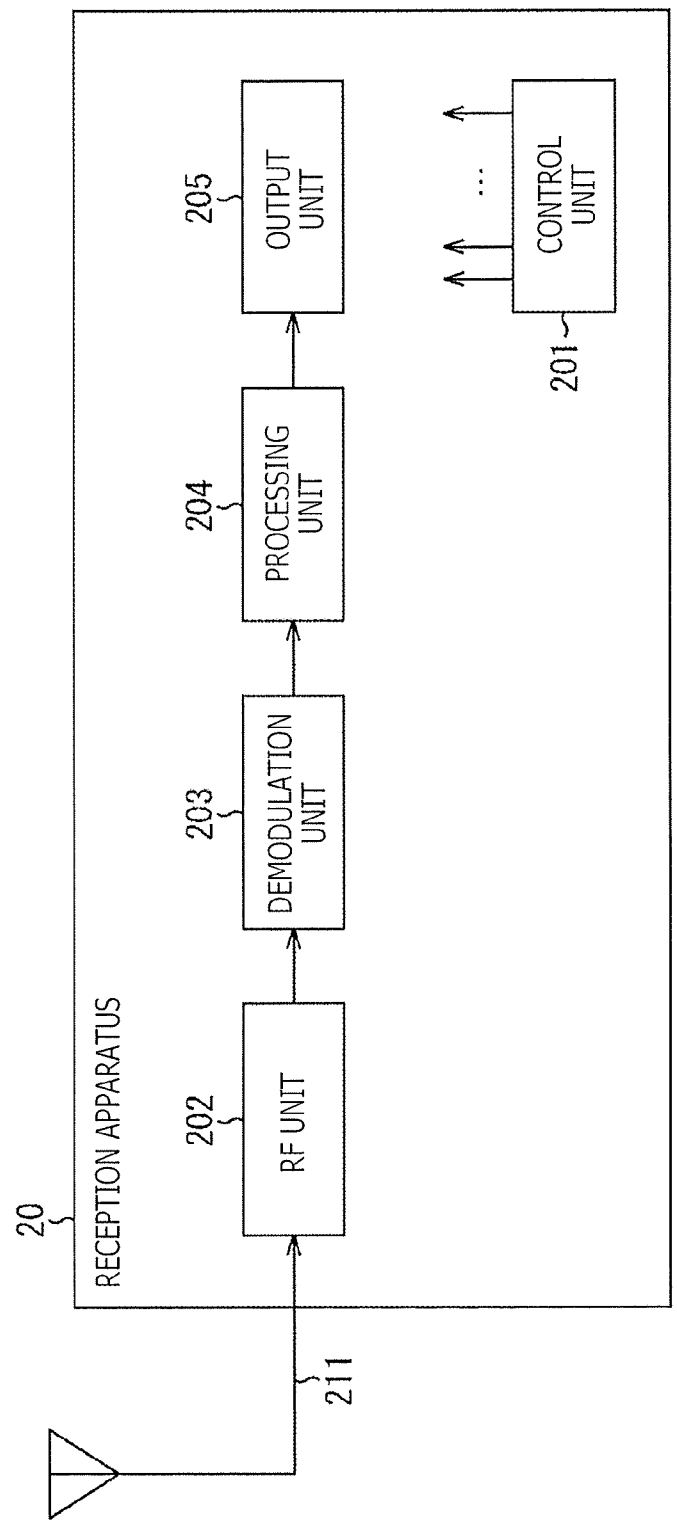
FIG. 2 is a diagram illustrating an exemplary configuration of a reception apparatus.

FIG. 2 is a diagram illustrating an exemplary configuration of the reception apparatus 20 in FIG. 1.

The reception apparatus 20 in FIG. 2 receives and processes the digital broadcast signal transmitted from the transmission apparatus 10 via the transmission path 30, through which the reception apparatus 20 reproduces the content such as the television program. In FIG. 2, the reception apparatus 20 includes a control unit 201, an RF unit 202, a demodulation unit 203, a processing unit 204, and an output unit 205.

The control unit 201 controls the operation of each unit of the reception apparatus 20.

The RF unit 202 receives the digital broadcast signal via an antenna 211 and converts the frequency thereof from a RF (Radio Frequency) signal to an IF (Intermediate Frequency) signal. The RF unit 202 then supplies the signal to the demodulation unit 203. Note that the RF unit 202 is configured as an RF IC, for example.

The demodulation unit 203 performs demodulation processing (e.g., OFDM (Orthogonal Frequency Division Multiplexing) demodulation) on the signal supplied from the RF unit 202. Further, the demodulation unit 203 performs error correction processing on a demodulation signal obtained by the demodulation processing, and supplies the signal obtained as a result of the processing to the processing unit 204. Note that the demodulation unit 203 is configured as a demodulation LSI (Large Scale Integration), for example.

The processing unit 204 performs processing (e.g., decoding processing) on the signal supplied from the demodulation unit 203, and supplies video and audio data obtained as a result of the processing to the output unit 205. Note that the processing unit 204 is configured as a main SoC (System on Chip), for example.

The output unit 205 includes, for example, a display unit, a speaker, and the like. The display unit displays images corresponding to the video data supplied from the processing unit 204. In addition, the speaker outputs sound corresponding to the audio data supplied from the processing unit 204. Note that the output unit 205 may also output the video and audio data supplied from the processing unit 204 to an external device.

The reception apparatus 20 is configured as described above. Note that the reception apparatus 20 may be a fixed receiver such as a television receiver, a set top box (STB), or a video recorder, or may be a mobile receiver such as a mobile phone, a smartphone, or a tablet terminal. Alternatively, the reception apparatus 20 may be an in-vehicle device mounted in a vehicle.

<2. Clock Synchronization Method to which Present Technology is Applied>

Now, the transmission system 1 (FIG. 1) employing the IP transmission method implements clock synchronization using time information. This time information is transmitted to synchronize the transmission apparatus 10 on the transmission side and the reception apparatus 20 on the reception side.

The clock synchronization herein means that the frequency of a system clock generated by a clock generation unit of the transmission apparatus 10 and the frequency of a system clock generated by a clock generation unit of the reception apparatus 20 become the same frequency. In a case where the transmission system 1 does not implement the clock synchronization, failure occurs while the reception apparatus 20 continues to receive digital broadcast signals. The examples of the failure include occurrence of frame drops. Therefore, the transmission system 1 needs to implement the clock synchronization.

ATSC 3.0 assumes that the PTP (Precision Time Protocol) is used as the time information for the clock synchronization. As will be described in detail later, the PTP is information representing an 80-bit time defined in IEEE 1588-2008. The 80-bit PTP includes a seconds field having 48 bits and a nanoseconds field having 32 bits.

Here, the conventional MPEG2 system (MPEG2-TS method) uses the PCR (Program Clock Reference) as the time information for synchronizing the transmission side and the reception side. Therefore, there have been demands for a proposal for performing the clock synchronization in a more suitable manner when the PTP is used as the time information. Accordingly, the present technology proposes, as the first embodiment, a clock synchronization method for performing the clock synchronization in a more suitable manner when the PTP is used as the time information.

Further, ATSC 3.0 assumes that a clock used in the physical layer in the protocol stack of the IP transmission method (hereinafter also referred to as a physical-layer clock) and the system clock are synchronized.

Therefore, there have been demands for a proposal for performing the clock synchronization in a more suitable manner when the physical-layer clock and the system clock are synchronized. Accordingly, the present technology proposes, as the second embodiment, a clock synchronization method for performing the clock synchronization in a more suitable manner when the physical-layer clock and the system clock are synchronized.

The following describes the first embodiment and the second embodiment in this order.

(1) First Embodiment: Clock Synchronization Method using PTP as Time Information Here, note that the clock synchronization method when the PCR is used as the time information will be described first, and the clock synchronization method when the PTP is used as the time information will be described thereafter, in order to compare the conventional MPEG2-TS method and the IP transmission method to which the present technology is applied.

(Clock Synchronization Method when PCR is used)

Figure 3:
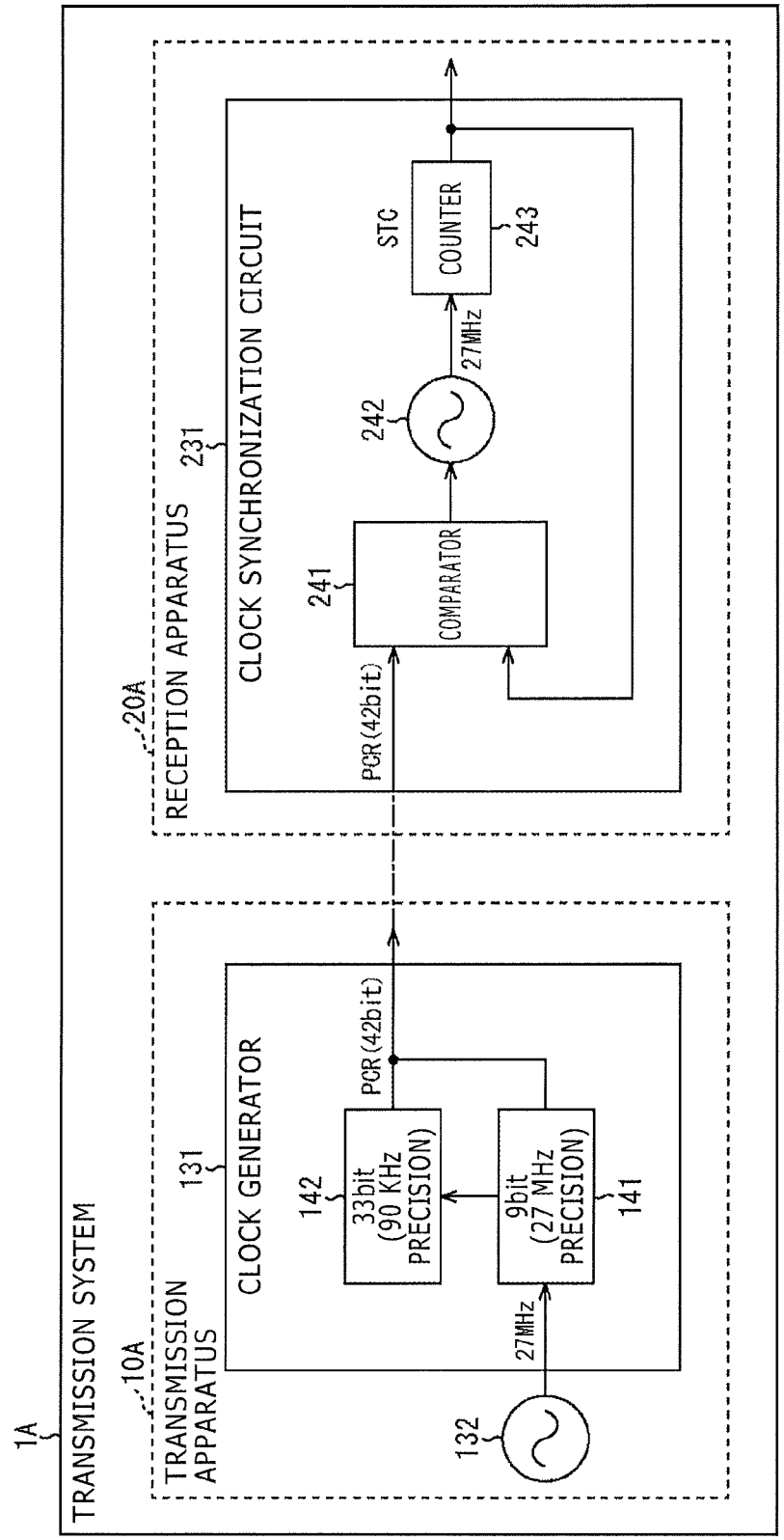
FIG. 3 is a diagram for describing a clock synchronization method when PCR is used as time information.

FIG. 3 is a diagram for describing the clock synchronization method when the PCR is used as the time information.

In FIG. 3, a transmission system 1A employing the MPEG2-TS method includes a transmission apparatus 10A and a reception apparatus 20A. Further, the transmission apparatus 10A includes a clock generator 131 and a voltage controlled oscillator 132.

The clock generator 131 includes a clock unit (time information generating unit) including a 9-bit counter 141 and a 33-bit counter 142. The 9-bit counter 141 counts a 27 MHz clock (system clock) generated by the voltage controlled oscillator 132 and divides the 27 MHz clock by 300 (incremented by 300 counts). The 90 KHz clock obtained by this 9-bit counter 141 is counted by the 33-bit counter 142. Then, the bit output having 42 bits (9+33 bits) from the 9-bit counter 141 and the 33-bit counter 142 becomes a system time clock (STC) as the time information.

The transmission apparatus 10A generates a TS packet having a field including the PCR corresponding to this system time clock (STC). The TS packet including this 42-bit PCR is generated at predetermined intervals and multiplexed together with a TS packet including data such as video and audio, through which a stream of the MPEG2-TS method is generated. Then, the stream of this MPEG2-TS method is transmitted as a digital broadcast signal.

Further, the reception apparatus 20A includes a clock synchronization circuit 231 in the transmission system 1A in FIG. 3. This clock synchronization circuit 231 includes a comparator 241, a voltage controlled oscillator 242, and a counter 243. Note that the counter 243 includes a 9-bit counter and a 33-bit counter.

The reception apparatus 20A receives the digital broadcast signal from the transmission apparatus 10A and extracts the TS packet from the stream of the MPEG2-TS method. Since this TS packet includes the 42-bit PCR, this PCR is extracted and supplied to the clock synchronization circuit 231.

In the clock synchronization circuit 231, the 42-bit PCR received first at the time of, for example, channel selection or power-on is set in the counter 243 as the initial value and the 42-bit PCR received thereafter is supplied to the comparator 241. Further, a 27 MHz clock (system clock) generated by the voltage controlled oscillator 242 is supplied to the counter 243.

In the counter 243, the 9-bit counter (not illustrated) counts the 27 MHz clock (system clock) received from the voltage controlled oscillator 242 and divides the 27 MHz clock by 300. The 90 KHz clock obtained by this 9-bit counter is counted by the 33-bit counter (not illustrated). Then, the bit output having 42 bits (9+33 bits) from the 9-bit counter and the 33-bit counter becomes a system time clock (STC) as the time information in the counter 243.

This system time clock (STC) is supplied to the comparator 241. The comparator 241 latches the system time clock (STC) received from the counter 243 at the timing, for example, when the 42-bit PCR is inputted, and compares the system time clock (STC) with the PCR. Then, a comparison error signal outputted from this comparator 241 is supplied to the voltage controlled oscillator 242 as a control signal.

In the clock synchronization circuit 231, in other words, the comparator 241, the voltage controlled oscillator 242, and the counter 243 constitute a PLL (Phase Locked Loop) circuit. The voltage controlled oscillator 242 generates the 27 MHz clock (system clock) synchronized with the 42-bit PCR, and the counter 243 generates the system time clock (STC) synchronized with the PCR.

As described above, the clock synchronization method using the PCR uses the 42-bit PCR as the time information for synchronizing the transmission apparatus 10A on the transmission side and the reception apparatus 20A on the reception side. With this PCR, the frequency of the system clock of the transmission apparatus 10A on the transmission side and the frequency of the system clock of the reception apparatus 20A on the reception side become the same frequency.

(Clock Synchronization Method when PTP is used)

Figure 4:
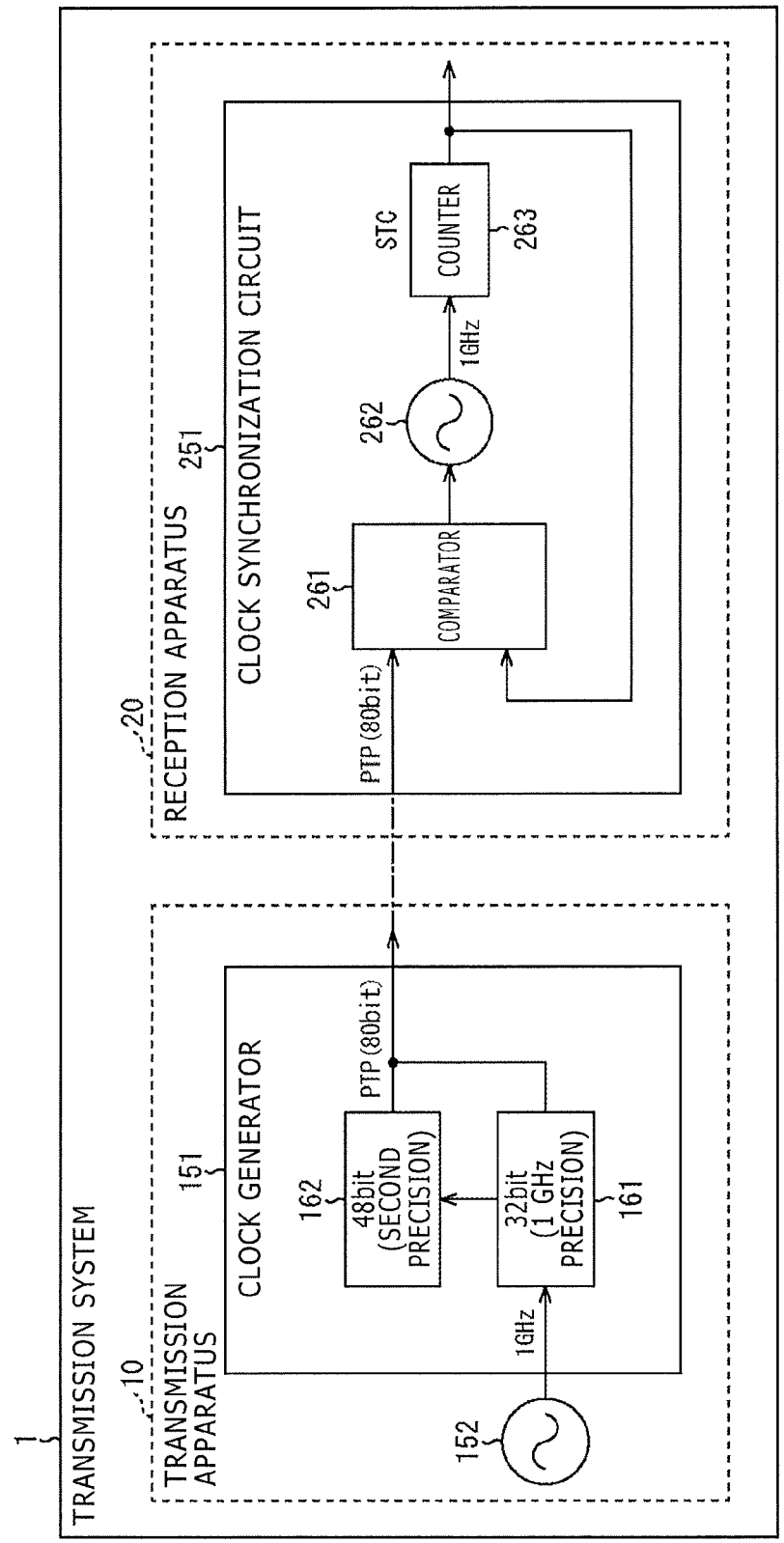
FIG. 4 is a diagram for describing a clock synchronization method when PTP is used as the time information.

FIG. 4 is a diagram for describing the clock synchronization method when the PTP is used as the time information.

In FIG. 4, the transmission system 1 employing the IP transmission method includes the transmission apparatus 10 and the reception apparatus 20. Further, the transmission apparatus 10 includes a clock generator 151 and a voltage controlled oscillator 152.

The clock generator 151 includes a clock unit (time information generating unit) including a 32-bit counter 161 and a 48-bit counter 162. The 32-bit counter 161 counts a 1 GHz clock (system clock) generated by the voltage controlled oscillator 152 and divides the 1 GHz clock by 100,000,000 (incremented by 100,000,000 counts). The clock with second precision obtained by this 32-bit counter 161 is counted by the 48-bit counter 162. Then, the bit output having 80 bits (32+48 bits) from the 32-bit counter 161 and the 48-bit counter 162 becomes a system time clock (STC) as the time information.

The transmission apparatus 10 generates an IP packet including the PTP corresponding to this system time clock (STC). The IP packet including this 80-bit PTP is generated at predetermined intervals and multiplexed together with an IP packet including data such as video and audio, through which a stream of the IP transmission method is generated. Then, the stream of this IP transmission method is transmitted as a digital broadcast signal.

Further, the reception apparatus 20 includes a clock synchronization circuit 251 in the transmission system 1 in FIG. 4. This clock synchronization circuit 251 includes a comparator 261, a voltage controlled oscillator 262, and a counter 263. Note that the counter 263 includes a 32-bit counter and a 48-bit counter.

The reception apparatus 20 receives the digital broadcast signal from the transmission apparatus 10 and extracts the IP packet from the stream of the IP transmission method. Since this IP packet includes the 80-bit PTP, this PTP is extracted and supplied to the clock synchronization circuit 251.

In the clock synchronization circuit 251, the 80-bit PTP received first at the time of, for example, channel selection or power-on is set in the counter 263 as the initial value and the 80-bit PTP received thereafter is supplied to the comparator 261. Further, a 1 GHz clock (system clock) generated by the voltage controlled oscillator 262 is supplied to the counter 263.

In the counter 263, the 32-bit counter (not illustrated) counts the 1 GHz clock (system clock) received from the voltage controlled oscillator 262 and divides the 1 GHz clock by 100,000,000. The clock with second precision obtained by this 32-bit counter is counted by the 48-bit counter (not illustrated). Then, the bit output having 80 bits (32+48 bits) from the 32-bit counter and the 48-bit counter becomes a system time clock (STC) as the time information in the counter 263.

This system time clock (STC) is supplied to the comparator 261. The comparator 261 latches the system time clock (STC) received from the counter 263 at the timing, for example, when the 80-bit PTP is inputted, and compares the system time clock (STC) with the PTP. Then, a comparison error signal outputted from this comparator 261 is supplied to the voltage controlled oscillator 262 as a control signal.

In the clock synchronization circuit 251, in other words, the comparator 261, the voltage controlled oscillator 262, and the counter 263 constitute a PLL circuit. The voltage controlled oscillator 262 generates the 1 GHz clock (system clock) synchronized with the 80-bit PTP, and the counter 263 generates the system time clock (STC) synchronized with the PTP. Accordingly, the reception apparatus 20 performs processing such as decoding processing (decoding) on the data (stream) such as video and audio stored in the IP packet on the basis of this system time clock (STC).

As described above, the clock synchronization method using the PTP uses the 80-bit PTP as the time information for synchronizing the transmission apparatus 10 on the transmission side and the reception apparatus 20 on the reception side. With this PTP, the frequency of the system clock of the transmission apparatus 10 on the transmission side and the frequency of the system clock of the reception apparatus 20 on the reception side become the same frequency.

(PTP Configuration)

FIG. 5 is a diagram illustrating an exemplary configuration of the PTP used as the time information of the IP transmission method. Note that the PTP is defined in the IEEE 1588-2008.

As illustrated in FIG. 5, among the 80 bits representing PTP time, a seconds field having 48 bits represents time in units of seconds and a nanoseconds field having the remaining 32 bits represents time in units of nanoseconds. Therefore, information about the time defined in the PTP has sufficient precision as the time information to be included in physical-layer frames, and can represent accurate time.

In other words, the PTP can represent time up to 48 bits, i.e., approximately 8.92 million years from Jan. 1, 1970 as the point of origin. Therefore, there is no possibility that problems such as the so-called year 2036 problem occur with the PTP. The year 2036 problem is that in a case where network time synchronization is performed using the NTP (Network Time Protocol), a malfunction is expected to occur due to the limitation of the time that the NTP can represent.

Note that the year 2036 problem is a problem where the NTP is expected to malfunction. The NTP represents time using the number of seconds cumulated since the point of origin, i.e., Jan. 1, 1900 (UTC). Since this value is represented with unsigned 32 bits, the NTP can only represent time up to $2^{32}-1$ seconds from the point of origin. Therefore, the next second (the 16th second) after 6:28:15 on Feb. 7, 2036 (UTC) that $2^{32}-1$ seconds have elapsed since the point of origin is recognized as the point of origin due to the digit overflow.

Further, since a leap second is not inserted or deleted in the PTP, there is an advantage that the control thereof is easy. Here, the leap second indicates one second inserted to or deleted from the UTC on the basis of the global agreement to prevent the UTC going forward in synchronization with the atomic time (TAI) from significantly deviating from the universal time (UT1) over the years due to the change in the Earth's rotation rate.

For example, the NTP defines the handling of the leap second. When a control signal that instructs insertion or deletion of the leap second is transmitted from a query destination NTP server, a device using the NTP needs to offset the clock of the device by one second. Therefore, the device using the NTP needs to be provided with a circuit that receives the control signal for correcting the leap second and adjusts the internal system time clock (STC) corresponding to the control signal. By contrast, the adjustment related to the leap second is not required in the PTP. Unlike when the NTP is used, therefore, there is no need to be provided with the circuit for the adjustment of the leap second. That is, the reception apparatus 20 does not need to be provided with the circuit for the adjustment of the leap second since the reception apparatus 20 uses the PTP as the time information.

Note that although the PTP includes the seconds field having 48 bits and the nanoseconds field having 32 bits as illustrated in FIG. 5, all of these fields need not to be used. The number of bits to be used may be reduced to lower the precision of the PTP when necessary. That is, it is indeed possible to represent extremely accurate time with the PTP, but when the transmission system 1 in FIG. 1 provides a service through broadcasting, transmitting the time information with precision more than necessary for the broadcasting presses the transmission band and is not efficient.

The 80-bit PTP is the time information with more than enough precision to provide the service through broadcasting. Even if the amount of information of the PTP is reduced to some extent, it is still possible to sufficiently maintain the provision of the service through broadcasting. As such, the transmission system 1 in FIG. 1 can transmit the PTP as the time information with the reduced amount of the information thereof. As the method for reducing the amount of information of the PTP, compressing the PTP is one example.

As the method for compressing the PTP, for example, 48 bits of the seconds field are reduced (compressed) to 32 bits, so as to be usable until the year 2106 (epoch 1970+ 136=2106). In this manner, it is possible to adjust (compress) the value to a required value in the PTP.

Further, it is common to use a 27 MHz or 90 MHz clock (system clock) in the digital broadcasting, and the PTP nanoseconds field for guaranteeing the 27 MHz or 90 MHz precision corresponds to 19 bits or 27 bits. In the PTP, therefore, even if 32 bits of the nanoseconds field are, for example, reduced to 19 bits or 27 bits by deleting the low-order 13 bits or 5 bits thereof, it is still possible to secure sufficient precision.

Note that the high-order 2 bits of the 32 bits of the nanoseconds field in the PTP are 0 at all times. Therefore, the nanoseconds field following deletion of the low-order 13 bits or 5 bits and having 19 bits or 27 bits can be made into the nanoseconds field having 17 bits or 25 bits by further deleting the high-order 2 bits.

Note that ATSC 3.0 assumes that when the PTP is used, 48 bits of the seconds field are adjusted (compressed) to 32 bits, while 32 bits of the nanoseconds field are adjusted (compressed) to 19 bits or 27 bits (17 bits or 25 bits).

(Flow of Data Processing)

Next, the following describes the flow of data processing executed by the reception apparatus 20 in FIG. 1 with reference to the flowchart in FIG. 6.

In step S21, the RE unit 202 receives a digital broadcast signal of the IP transmission method transmitted from the transmission apparatus 10 via the antenna 211.

In step S22, the clock synchronization circuit 251 generates a system time clock (STC) by performing clock synchronization processing on the basis of the time information (PTP) obtained from the digital broadcast signal received in the processing in step S21. The details of this clock synchronization processing will be described later with reference to the flowchart in FIG. 7.

In step S23, the processing unit 204 performs predetermined processing on the basis of the system time clock (STC) generated in the processing in step S22. For example, the processing unit 204 performs processing such as the decoding processing (decoding) on data (stream) such as video and audio according to the system time clock (STC).

When the processing in step S23 ends, the data processing in FIG. 6 ends.

The flow of the data processing has been described hereinabove.

(Flow of Clock Synchronization Processing According to First Embodiment)

Next, the following describes the details of the clock synchronization processing corresponding to step S22 in FIG. 6 with reference to the flowchart in FIG. 7. The clock synchronization processing is executed by the reception apparatus 20 in FIG. 1. This clock synchronization processing is the clock synchronization processing when the PTP is used as the time information, corresponding to the first embodiment.

In step S41, the comparator 261 latches a system time clock (STC) received from the counter 263 at the timing when an 80-bit PTP is inputted, and compares the system time clock (SIC) with the PTP. The comparator 261 then supplies a control signal (comparison error signal) corresponding to the comparison result to the voltage controlled oscillator 262.

In step S42, the voltage controlled oscillator 262 generates a 1 GHz clock (system clock) according to the control signal (comparison error signal) received from the comparator 261 and supplies the 1 GHz clock(system clock) to the counter 263.

Note that the clock (system clock) generated by the voltage controlled oscillator 262 is not limited to 1 GHz, and can be a frequency with reduced precision when necessary.

In step S43, the counter 263 generates a system time clock (STC) as a processing clock on the basis of the 1 GHz clock (system clock) received from the voltage controlled oscillator 262.

Here, in the counter 263, the 32-bit counter counts the 1 GHz clock (system clock) generated by the voltage controlled oscillator 262 and the clock with second precision obtained by this 32-bit counter is counted by the 48-bit counter. Then, the bit output having 80 bits (32+48 bits) from the 32-bit counter and the 48-bit counter becomes the system time clock (STC) in the counter 263.

When the processing in step S43 ends, the processing returns to step S41 and the processing in steps S41 through 43 is repeated. In other words, the loop of the clock synchronization processing executed by the comparator 261, the voltage controlled oscillator 262, and the counter 263 constituting the PLL circuit is repeated, through which the 1 GHz clock (system clock) synchronized with the 80-bit PTP is generated and then the system time clock (STC) synchronized with the PTP is generated.

The flow of the clock synchronization processing according to the first embodiment has been described hereinabove. This clock synchronization processing according to the first embodiment uses the 80-bit PTP as the time information for synchronizing the transmission apparatus 10 on the transmission side and the reception apparatus 20 on the reception side. With this PTP, the clock synchronization is performed such that the frequency of the system clock of the transmission apparatus 10 on the transmission side and the frequency of the system clock of the reception apparatus 20 on the reception side become the same frequency.

As described above, the 80-bit PTP including the seconds field having 48 bits and the nanoseconds field having 32 bits is used as the time information for synchronizing the transmission apparatus 10 on the transmission side and the reception apparatus 20 on the reception side in the clock synchronization method using the PTP. Since the 80-bit PTP has sufficient precision as the time information and can represent accurate time, problems like the year 2036 problem that NTP has do not occur. Unlike the NTP, in addition, since the adjustment related to the leap second is not required, there is no need to be provided with the circuit for the adjustment of the leap second. Therefore, the circuit can be simplified.

(2) Second Embodiment: Clock Synchronization Method when Physical-Layer Clock and System Clock are Synchronized (Clock Synchronization Method According to Second Embodiment)

Figure 8:
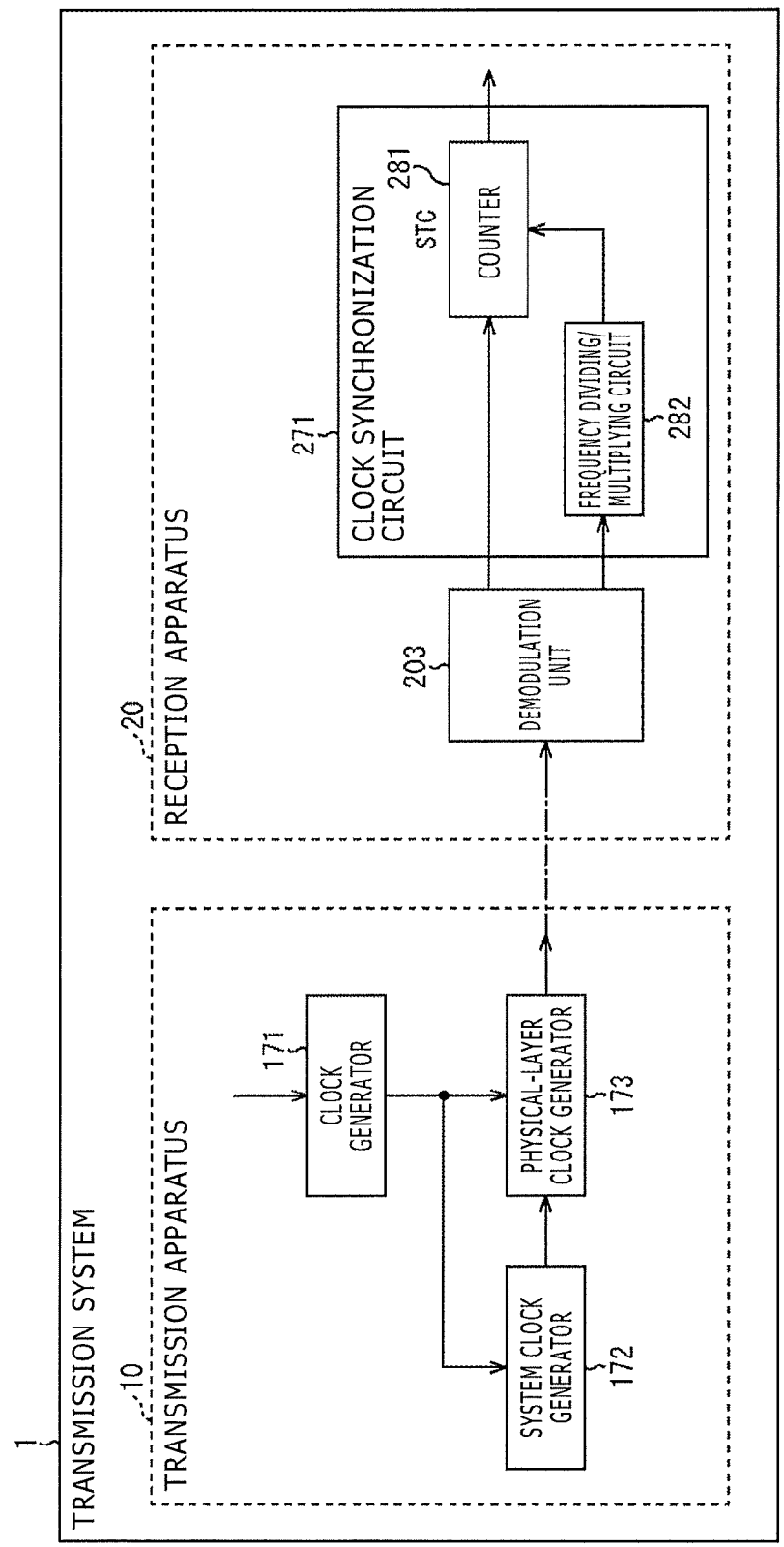
FIG. 8 is a diagram for describing a clock synchronization method when a physical-layer clock and a system clock are synchronized.

FIG. 8 is a diagram for describing a clock synchronization method when a physical-layer clock and a system clock are synchronized.

In FIG. 8, a transmission system 1 includes a transmission apparatus 10 and a reception apparatus 20. Further, the transmission apparatus 10 includes a clock generator 171, a system clock generator 172, and a physical-layer clock generator 173.

The clock generator 171 generates a clock on the basis of an external time synchronization signal and supplies the clock to the system clock generator 172 and the physical-layer clock generator 173. Note that a GPS (Global Positioning System), NTP (Network Time Protocol), or the like can be used as the external time synchronization signal, for example.

The system clock generator 172 generates a system clock on the basis of the clock supplied from the clock generator 171. Further, the physical-layer clock generator 173 generates a physical-layer clock on the basis of the clock supplied from the clock generator 171.

In other words, the clock inputted to the system clock generator 172 and the clock inputted to the physical-layer clock generator 173 are synchronized since both are generated by the system clock generator 172 Therefore, the system clock and the physical-layer clock are synchronized with each other.

For example, the transmission apparatus 10 performs processing relating to the physical layer such as a physical-layer frame according to this physical-layer clock. Additionally, for example, the transmission apparatus 10 performs processing such as encoding processing (encoding) on data (stream) such as video and audio according to a clock (system time clock) corresponding to this system clock. Then, the transmission apparatus 10 generates a stream of the IP transmission method by multiplexing an IP packet including the data such as video and audio, and transmits the stream of this IP transmission method as a digital broadcast signal.

Further, the reception apparatus 20 includes a demodulation unit 203 and a clock synchronization circuit 271 in the transmission system 1 in FIG. 8. This clock synchronization circuit 271 includes a counter 281 and a frequency dividing/multiplying circuit 282.

In the reception apparatus 20, the digital broadcast signal is received from the transmission apparatus 10 and the demodulation unit 203 demodulates the physical-layer frame. The demodulation unit 203 obtains time information (PTP) transmitted as the signaling of the physical layer in the preamble or bootstrap of the physical-layer frame, and supplies the time information (PTP) to the clock synchronization circuit 271. Further, the demodulation unit 203 generates a clock (physical-layer clock) whose original oscillation is a frame period T of the physical-layer frame, and supplies the clock (physical-layer clock) to the clock synchronization circuit 271.

In the clock synchronization circuit 271, an 80-bit PIP which is the time information (PTP) supplied from the demodulation unit 203 and received first at the time of, for example, channel selection or power-on is set in the counter 281 as the initial value and the 80-bit PTP received thereafter is not used (discarded). That is, with the 80-bit PTP set as the initial value of the counter 281, the counter 281 can generate time which is absolute (absolute time) as a system time clock (SIC).

Further, the physical-layer clock supplied from the demodulation unit 203 is supplied to the frequency dividing/multiplying circuit 282 in the clock synchronization circuit 271. By dividing or multiplying the physical-layer clock (the clock whose original oscillation is the frame period T of the physical-layer frame) received from the demodulation unit 203, the frequency dividing/multiplying circuit 282 generates a clock with a desired frequency and supplies the clock to the counter 281. Here, the frequency dividing/multiplying circuit 282 multiplies the (frequency of) the physical-layer clock from 5 MHz to 1 GHz and supplies this 1 GHz clock (system clock) to the counter 281, for example.

That is, since the physical-layer clock and the system clock are synchronized in the transmission apparatus 10, the phases of these clocks match even if the frequencies thereof are different. Therefore, the frequency dividing/multiplying circuit 282 in the reception apparatus 20 can generate the system clock by dividing or multiplying the physical-layer clock.

In the counter 281, for example, a 32-bit counter (not illustrated) counts the 1 GHz clock (system clock) received from the frequency dividing/multiplying circuit 282, and the clock with second precision obtained by this 32-bit counter is counted by a 48-bit counter (not illustrated). Then, the bit output having 80 bits (32+48 bits) from the 32-bit counter and the 48-bit counter becomes the system time clock (STC) as the time information in the counter 281. Accordingly, the reception apparatus 20 performs processing such as decoding processing (decoding) on the data (stream) such as video and audio stored in the IP packet on the basis of this system time clock (STC).

As described above, in the clock synchronization method when the physical-layer clock and the system clock are synchronized, the reception apparatus 20 generates the system clock from the physical-layer clock and then generates the system time clock (STC) on the basis of this system clock on the assumption that the physical-layer clock and the system clock are synchronized in the transmission apparatus 10. Generating the system clock from the physical-layer clock in this manner eliminates the need to configure a PLL circuit using a comparator and a voltage controlled oscillator in the reception apparatus 20. Therefore, the clock synchronization circuit can be simplified.

Note that when using the PTP as the time information, as with the above-described first embodiment, not only the 80-bit PTP including the seconds field having 48 bits and the nanoseconds field having 32 bits, but also compressed time information may be used in this second embodiment. The compressed time information is obtained by adjusting 48 bits of the seconds field to 32 bits and adjusting 32 bits of the nanoseconds field to 19 bits or 27 bits (17 bits or 25 bits), for example.

(Frame Period of Physical-Layer Frames)

Figure 9:
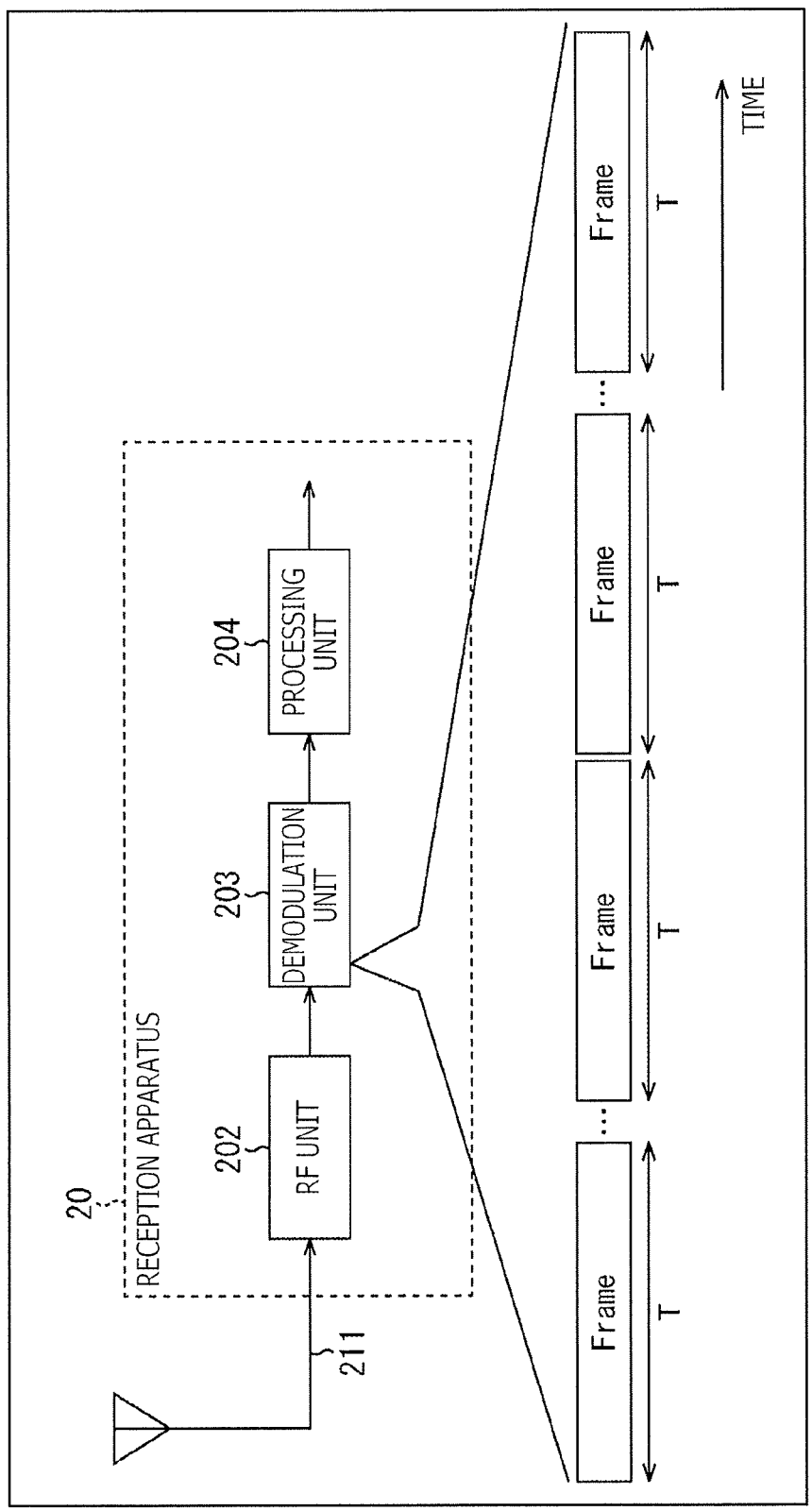
FIG. 9 is a diagram for describing a frame period of physical-layer frames.

FIG. 9 is a diagram for describing the frame period T of physical-layer frames processed by the demodulation unit 203.

As illustrated in FIG. 9, each physical-layer frame to be processed by the demodulation unit 203 is transmitted at fixed period intervals every frame period T. In the present technology, the reception apparatus 20 uses this frame period T and divides or multiplies the clock (physical-layer clock) whose original oscillation is the frame period T to generate the system clock with a desired frequency, on the assumption that the physical-layer clock and the system clock are synchronized in the transmission apparatus 10 (in the broadcast station).

Note that although the frame period T which is the fixed period is relative time in FIG. 9, the IP transmission method assumes that the system time clock (SIC) is handled as the time that is absolute (absolute time) to operate the system. Therefore, the time (absolute time) indicated by the time information (PIP) is set as the initial value in the system synchronization circuit 271 in FIG. 8.

In FIG. 9, moreover, since the frame period T of each physical-layer frame is the fixed period, the time information (PTP) transmitted in the preamble or the bootstrap of each physical-layer frame is also transmitted with an accurate period.

(Flow of Clock Synchronization Processing According to Second Embodiment)

Figure 10:
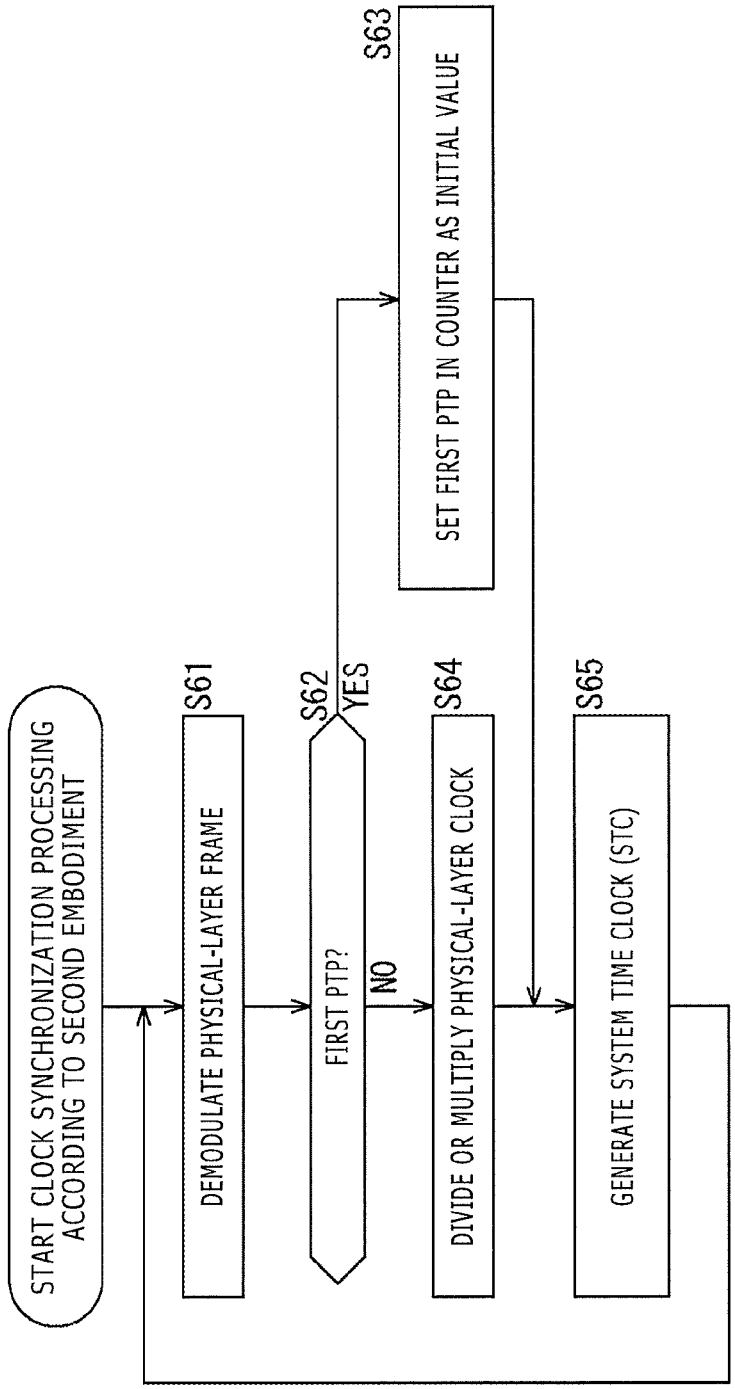
FIG. 10 is a flowchart for describing a flow of clock synchronization processing according to a second embodiment.

Next, the following describes the flow of the clock synchronization processing when the physical-layer clock and the system clock are synchronized with reference to the flowchart in FIG. 10. The clock synchronization processing is executed by the reception apparatus 20 in FIG. 1. Note that this clock synchronization processing is the clock synchronization processing corresponding to step S22 in FIG. 6.

In step S61, the demodulation unit 203 demodulates a physical-layer frame by performing the demodulation processing on a signal supplied from the RF unit 202. Then, the demodulation unit 203 obtains time information (PTP) transmitted as the signaling of the physical layer, and supplies the time information (PTP) to the counter 281 (of the clock synchronization circuit 271). Further, the demodulation unit 203 generates a clock (physical-layer clock) whose original oscillation is the frame period T of the physical-layer frame, and supplies the clock (physical-layer clock) to the frequency dividing/multiplying circuit 282.

In step S62, it is determined whether the time information (PTP) obtained in the processing in step S61 is the time information (PTP) received first at the time of, for example, channel selection or power-on. Note that the time information (PTP) is transmitted in the preamble or bootstrap of the physical-layer frame.

In step S62, if the time information (PTP) is determined to be the time information (PTP) received first, the processing proceeds to step S63. In step S63, the counter 281 sets, as the initial value, the time information (PTP) received first at the time of channel selection or the like in the processing in step S61.

In step S62, on the other hand, if the time information (PTP) is determined not to be the time information (PTP) received first, that is, the time information (PTP) is determined to be the time information (PTP) received after the reception of the first time information (PTP), the processing proceeds to step S64. In step S64, the frequency dividing/multiplying circuit 282 generates a system clock by dividing or multiplying the physical-layer clock generated in the processing in step S61 and supplies the system clock to the counter 281.

For example, the frequency dividing/multiplying circuit 282 multiplies (the frequency of) the physical-layer clock from 5 MHz to 1 GHz and supplies this 1 GHz clock (system clock) to the counter 281. Note that the clock (system clock) generated by the frequency dividing/multiplying circuit 282 is not limited to 1 GHz, and can be a frequency with reduced precision when necessary.

When the step S63 or S64 ends, the processing proceeds to step S65.

In step S65, the counter 281 generates a system time clock (STC) as a processing clock on the basis of the system clock generated in the processing in step 864.

When the processing in step S65 ends, the processing returns to step S61 and the processing in steps S61 through S65 is repeated. In other words, repeating the loop of this clock synchronization processing generates the system clock from the physical-layer clock, through which the system time clock (STC) is generated on the basis of this system clock.

The flow of the clock synchronization processing according to the second embodiment has been described hereinabove.

As described above, in the clock synchronization method when the physical-layer clock and the system clock are synchronized, the reception apparatus 20 uses this frame period T and divides or multiplies the clock (physical-layer clock) whose original oscillation is the frame period T to generate the system clock with a desired frequency and generate the system time clock (STC) corresponding to this system clock on the assumption that the physical-layer clock and the system clock are synchronized in the transmission apparatus 10. That is, generating the system clock from the physical-layer clock eliminates the need to configure the PLL circuit using the comparator and the voltage controlled oscillator in the reception apparatus 20. Therefore, the clock synchronization circuit can be simplified.

<3. Modification>

Note that although the PTP has been described as the time information in the description above, the time information is not limited to the PTP. For example, it is possible to employ reference time such as the UTC (Coordinated Universal Time), information about the time defined in a predetermined standard, or any other information about the time such as information about the time in a uniquely determined format.

Further, although ATSC (ATSC 3.0 in particular), which is the method mainly employed in the United States of America and the like, has been described as the standard of the digital broadcasting in the above description, the present technology may be applied to the ISDB (Integrated Services Digital Broadcasting), the DVB (Digital Video Broadcasting), or the like. The ISDB is the method employed in Japan and the like. The DVB is th method employed in European countries and the like. Further, the present technology may be employed in satellite digital broadcasting, digital cable broadcasting, or the like, besides terrestrial digital broadcasting.

Further, the present technology can be applied to the standards other than the standard of the digital broadcasting. In that case, a communication line such as the Internet or a telephone network can be used as the transmission path 30, for example. Further, the transmission apparatus 10 can be a server provided on the Internet, for example.

<4. Computer Configuration>

Figure 11:
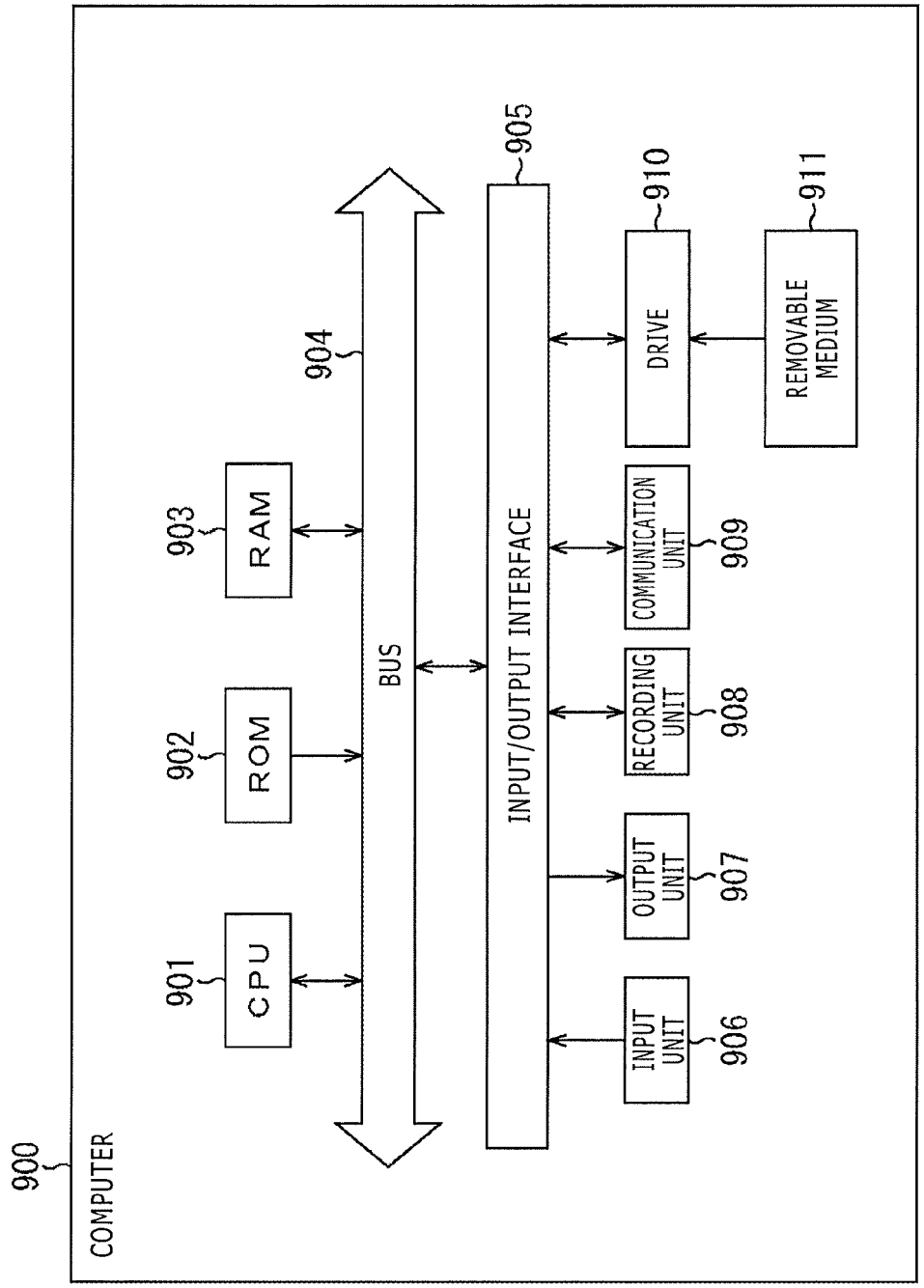
FIG. 11 is a diagram illustrating an exemplary configuration of a computer.

The series of processing described above can be executed by hardware or software. When the series of processing is to be executed by software, a program constituting the software is installed in a computer. FIG. 11 is a diagram illustrating an exemplary hardware configuration of the computer in which the program executes the series of processing described above.

In a computer 900, a CPU (Central Processing Unit) 901, a ROM (Read Only Memory) 902, and a RAM (Random Access Memory) 903 are mutually connected via a bus 904. Additionally, an input/output interface 905 is connected the bus 904. An input unit 906, an output unit 907, a recording unit 908, a communication unit 909, and a drive 910 are connected to the input/output interface 905.

The input unit 906 includes a keyboard, a mouse, a microphone, and the like. The output unit 907 includes a display, a speaker, and the like. The recording unit 908 includes a hard disk, non-volatile memory, and the like. The communication unit 909 includes a network interface and the like. The drive 910 drives a removable medium 911 such as a magnetic disk, an optical disk, a magneto-optical disk, semiconductor memory, or the like.

In the computer 900 configured as above, the CPU 901 loads the program recorded in the ROM 902 or the recording unit 908 into the RAM 903 via the input/output interface 905 and the bus 904 and executes the program, through which the above-described series of processing is performed.

The program to be executed by the computer 900 (CPU 901) can be recorded and provided on the removable medium 911 as a package medium, for example. Further, the program can be provided via a wired or wireless transmission medium such as a local area network, the Internet, or digital satellite broadcasting.

In the computer 900, the program can be installed in the recording unit 908 via the input/output interface 905 by attaching the removable medium 911 to the drive 910. Further, the program can be received by the communication unit 909 via a wired or wireless transmission medium and installed in the recording unit 908. Additionally, the program can be installed in advance in the ROM 902 or the recording unit 908.

Here, the processing performed by the computer in accordance with the program in the present specification does not necessarily need to be performed in the time sequence following the order described as the flowcharts. That is, the processing performed by the computer in accordance with the program also includes processing that is executed in parallel or individually (e.g., parallel processing or processing by an object). Further, the program may be processed by a single computer (processor) or by a plurality of computers in a distributed manner.

Note that the embodiments of the present technology are not limited to the above-described embodiments and various modifications can be made without departing from the gist of the present technology.

Additionally, the present technology can be configured as follows.

(1)

A reception apparatus including:

a reception unit that receives a digital broadcast signal of an IP (Internet Protocol) transmission method including time information and a stream of content, the time information including a seconds field and a nanoseconds field;

a clock generation unit that generates a processing clock synchronized with the time information on the basis of the time information included in the digital broadcast signal; and a processing unit that processes the stream included in the digital broadcast signal on the basis of the processing clock.

(2)

The reception apparatus according to (1), in which the time information is information about time defined in PTP (Precision Time Protocol) and including a seconds field having 48 bits and a nanoseconds field having 32 bits.

(3)

The reception apparatus according to (1) or (2), in which the clock generation unit includes a voltage controlled oscillator that generates a system clock;

a counter that includes a 32-bit counter that counts and divides a clock output from the voltage controlled oscillator and a 48-bit counter that counts a division output of the 32-bit counter; and a comparator that compares a bit output of the counter with the time information included in the digital broadcast signal and supplies an error signal corresponding to a result of the comparison to the voltage controlled oscillator as a control signal.

(4)

The reception apparatus according to (2) or (3), in which the time information is compressed into compressed time information in which the time information is compressed by deleting one or more high-order bits of the seconds field and deleting one or more low-order bits of the nanoseconds field among the seconds field having 48 bits and the nanoseconds field having 32 bits that constitute the information about the time defined in the PTP.

(5)

The reception apparatus according to (4), in which the seconds field is made into 32 bits and the nanoseconds field is made into 19 bits or 27 bits in the compressed time information.

(6)

The reception apparatus according to (5), in which the nanoseconds field is made into 17 bits or 25 bits in the compressed time information by further deleting high-order 2 bits of the nanoseconds field.

(7)

A data processing method for a reception apparatus, the data processing method including the steps of:

by the reception apparatus, receiving a digital broadcast signal of an IP transmission method including time information and a stream of content, the time information including a seconds field and a nanoseconds field;

generating a processing clock synchronized with the time information on the basis of the time information included in the digital broadcast signal; and processing the stream included in the digital broadcast signal on the basis of the processing clock.

(8)

A reception apparatus including:

a reception unit that receives a digital broadcast signal of an IP transmission method including time information and a stream of content;

a demodulation unit that demodulates a frame of a physical layer in a protocol stack of the IP transmission method;

a clock generation unit that generates a processing clock on the basis of a system clock generated from a physical-layer clock corresponding to a frame period of the frame, the processing clock based on the time information obtained from the frame; and a processing unit that processes the stream included in the digital broadcast signal on the basis of the processing clock, in which the physical-layer clock and the system clock are synchronized in a transmission apparatus that transmits the digital broadcast signal.

(9)

The reception apparatus according to (8), in which the clock generation unit includes a frequency dividing/multiplying unit that generates the system clock by dividing or multiplying the physical-layer clock; and a counter that generates the processing clock by setting the time information as an initial value and counting the system clock.

(10)

The reception apparatus according to (8) or (9),
in which the frame period is constant per frame, and
the physical-layer clock is a clock whose original oscillation is the frame period of the frame.

(11)

The reception apparatus according to any one of (8) to (10),
in which the time information is information about time defined in PTP and including a seconds field and a nanoseconds field.

(12)

The reception apparatus according to (11),
in which the time information is compressed into compressed time information in which the time information is compressed by deleting one or more high-order bits of the seconds field and deleting one or more low-order bits of the nanoseconds field among the seconds field having 48 bits and the nanoseconds field having 32 bits that constitute the information about the time defined in the PTP.

(13)

The reception apparatus according to (12),
in which the seconds field is made into 32 bits and the nanoseconds field is made into 19 bits or 27 bits in the compressed time information.

(14)

The reception apparatus according to (13),
in which the nanoseconds field is made into 17 bits or 25 bits in the compressed time information by further deleting high-order 2 bits of the nanoseconds field.

(15)

A data processing method for a reception apparatus, the data processing method including the steps of:
by the reception apparatus,
receiving a digital broadcast signal of an IP transmission method including time information and a stream of content;
demodulating a frame of a physical layer in a protocol stack of the IP transmission method;
generating a processing clock on the basis of a system clock generated from a physical-layer clock corresponding to a frame period of the frame, the processing clock based on the time information obtained from the frame; and
processing the stream included in the digital broadcast signal on the basis of the processing clock,
in which the physical-layer clock and the system clock are synchronized in a transmission apparatus that transmits the digital broadcast signal.

REFERENCE SIGNS LIST

1 Transmission system
10 Transmission apparatus
20 Reception apparatus
30 Transmission path
151 Clock generator
152 Voltage controlled oscillator
161 32-bit counter
162 48-bit counter
171 Clock generator
172 System clock generator
173 Physical-layer clock generator
201 Control unit
202 RF unit
203 Demodulation unit
204 Processing unit
205 Output unit
251 Clock synchronization circuit
261 Comparator
262 Voltage controlled oscillator
263 Counter
271 Clock synchronization circuit
281 Counter
282 Frequency dividing/multiplying circuit
900 Computer
901 CPU

The invention claimed is:

1. A reception apparatus comprising:
receiver circuitry configured to receive a digital broadcast signal of an IP (Internet Protocol) transmission method including time information and a stream of content, the time information including a seconds field and a nanoseconds field and being transmitted as signaling of a physical layer in a preamble or a bootstrap of a frame of the physical layer in a protocol stack of the IP transmission method; and
processing circuitry configured to
generate a processing clock synchronized with the time information based on the time information included in the digital broadcast signal; and
process the stream included in the digital broadcast signal based on the processing clock, wherein
the time information is information about time defined in PTP (Precision Time Protocol) and including the seconds field and the nanoseconds field, and
the time information is compressed into compressed time information in which the time information is compressed by deleting one or more high-order bits of the seconds field and deleting one or more low-order bits of the nanoseconds field.

2. The reception apparatus according to claim 1,
wherein the processing circuitry includes
a voltage controlled oscillator that generates a system clock;
a counter that includes a 32-bit counter that counts and divides a clock output from the voltage controlled oscillator and a 48-bit counter that counts a division output of the 32-bit counter; and
a comparator that compares a bit output of the counter with the time information included in the digital broadcast signal and supplies an error signal corresponding to a result of the comparison to the voltage controlled oscillator as a control signal.

3. The reception apparatus according to claim 1,
wherein the seconds field is made into 32 bits and the nanoseconds field is made into 19 bits or 27 bits in the compressed time information.

4. The reception apparatus according to claim 3,
wherein the nanoseconds field is made into 17 bits or 25 bits in the compressed time information by further deleting high-order 2 bits of the nanoseconds field.

5. A data processing method for a reception apparatus, the data processing method comprising:
receiving, by receiver circuitry of a reception apparatus, a digital broadcast signal of an IP transmission method including time information and a stream of content, the time information including a seconds field and a nanoseconds field and being transmitted as signaling of a physical layer in a preamble or a bootstrap of a frame of the physical layer in a protocol stack of the IP transmission method;

generating, by processing circuitry of the reception apparatus, a processing clock synchronized with the time information based on the time information included in the digital broadcast signal; and processing the stream included in the digital broadcast signal based on the processing clock, wherein the time information is information about time defined in PTP (Precision Time Protocol) and including the seconds field and the nanoseconds field, and the time information is compressed into compressed time information in which the time information is compressed by deleting one or more high-order bits of the seconds field and deleting one or more low-order bits of the nanoseconds field.

6. A reception apparatus comprising:

receiver circuitry configured to receive a digital broadcast signal of an IP transmission method including time information and a stream of content, and demodulate a frame of a physical layer in a protocol stack of the IP transmission method; and processing circuitry configured to generate a processing clock based on a system clock generated from a physical-layer clock corresponding to a frame period of the frame, the processing clock based on the time information obtained from the frame; and process the stream included in the digital broadcast signal based on the processing clock, wherein the physical-layer clock and the system clock are synchronized in a transmission apparatus that transmits the digital broadcast signal, the time information is transmitted as signaling of the physical layer in a preamble or a bootstrap of the frame of the physical layer, the time information is information about time defined in PTP (Precision Time Protocol) and including a seconds field and a nanoseconds field, and the time information is compressed into compressed time information in which the time information is compressed by deleting one or more high-order bits of the seconds field and deleting one or more low-order bits of the nanoseconds field.

7. The reception apparatus according to claim 6, wherein the processing circuitry includes a frequency dividing/multiplying unit that generates the system clock by dividing or multiplying the physical-layer clock; and a counter that generates the processing clock by setting the time information as an initial value and counting the system clock.

8. The reception apparatus according to claim 7, wherein the frame period is constant per frame, and the physical-layer clock is a clock whose original oscillation is the frame period of the frame.

9. The reception apparatus according to claim 6, wherein the seconds field is made into 32 bits and the nanoseconds field is made into 19 bits or 27 bits in the compressed time information.

10. The reception apparatus according to claim 9, wherein the nanoseconds field is made into 17 bits or 25 bits in the compressed time information by further deleting high-order 2 bits of the nanoseconds field.

11. A data processing method for a reception apparatus, the data processing method comprising:

receiving, by receiver circuitry of the reception apparatus, a digital broadcast signal of an IP transmission method including time information and a stream of content;

demodulating a frame of a physical layer in a protocol stack of the IP transmission method;

generating, by processing circuitry of the reception apparatus, a processing clock based on a system clock generated from a physical-layer clock corresponding to a frame period of the frame, the processing clock based on the time information obtained from the frame; and processing the stream included in the digital broadcast signal based on the processing clock, wherein the physical-layer clock and the system clock are synchronized in a transmission apparatus that transmits the digital broadcast signal, the time information is transmitted as signaling of the physical layer in a preamble or a bootstrap of the frame of the physical layer, the time information is information about time defined in PTP (Precision Time Protocol) and including a seconds field and a nanoseconds field, and the time information is compressed into compressed time information in which the time information is compressed by deleting one or more high-order bits of the seconds field and deleting one or more low-order bits of the nanoseconds field.

12. A reception apparatus comprising:

receiver circuitry configured to receive a digital broadcast signal of an IP (Internet Protocol) transmission including time information and a stream of content, the time information including a first seconds field and a second seconds field, and being compressed and transmitted as signaling of a physical layer in a preamble or a bootstrap of a frame of the physical layer in a protocol stack of the IP transmission, wherein the time information is compressed into compressed time information in which the time information is compressed by reducing one or more high-order bits of the first seconds field and reducing one or more low- order bits of the second seconds field; and processing circuitry configured to generate a processing clock synchronized with the time information based on the time information included in the digital broadcast signal; and process the stream included in the digital broadcast signal based on the processing clock, wherein the time information is information about time defined in PTP (Precision Time Protocol) and including the first seconds field and the second seconds field.

13. The reception apparatus according to claim 12, wherein the processing circuitry includes a voltage controlled oscillator that generates a system clock;

a counter that includes a 32-bit counter that counts and divides a clock output from the voltage controlled oscillator and a 48-bit counter that counts a division output of the 32-bit counter; and a comparator that compares a bit output of the counter with the time information included in the digital broadcast signal and supplies an error signal corresponding to a result of the comparison to the voltage controlled oscillator as a control signal.

14. The reception apparatus according to claim 12, wherein the first seconds field is made into 32 bits and the second seconds field is made into 19 bits or 27 bits in the compressed time information.

15. The reception apparatus according to claim 14, wherein the second seconds field is made into 17 bits or 25 bits in the compressed time information by further deleting high-order 2 bits of the second seconds field.

16. The reception apparatus according to claim 12, wherein the first seconds field represents up to 48 bits from Jan. 1, 1970 as a point of origin.

17. The reception apparatus according to claim 12, wherein adjustment related to a leap second is not required for the first seconds field.

18. The reception apparatus according to claim 12, wherein the time information contains the information associated with Coordinated Universal Time (UTC).

19. The reception apparatus according to claim 12, wherein the time information contains the information associated with International Atomic Time (TAI).

* * * * *